(12) United States Patent
Baumann et al.

(10) Patent No.: US 9,086,473 B2
(45) Date of Patent: Jul. 21, 2015

(54) ARRANGEMENT ON A COMPONENT OF A MOTOR VEHICLE

(71) Applicant: Volkswagen Aktiengesellschaft, Wolfsburg (DE)

(72) Inventors: Peter Baumann, Braunschweig (DE); Thilo Draeger, Gifhorn (DE); Georg Lambert, Wolfsburg (DE); Ralf Schmuelling, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/456,727

(22) Filed: Aug. 11, 2014

(65) Prior Publication Data

US 2014/0347962 A1      Nov. 27, 2014

Related U.S. Application Data

(63) Continuation of application No. PCT/EP2013/051414, filed on Jan. 25, 2013.

(30) Foreign Application Priority Data

Feb. 11, 2012   (DE) .................. 10 2012 002 760

(51) Int. Cl.
  *G01S 7/52*  (2006.01)
  *B60R 19/48*  (2006.01)
  (Continued)

(52) U.S. Cl.
  CPC ............... *G01S 7/52* (2013.01); *B60R 19/483* (2013.01); *G01S 7/521* (2013.01); *G01S 15/931* (2013.01); *G01S 2015/938* (2013.01)

(58) Field of Classification Search
  CPC ....... B60R 19/483; G01S 15/931; G01S 7/52; G01S 7/521; G01S 2015/938
  USPC .......................................... 367/188; 293/117
  See application file for complete search history.

(56) References Cited

U.S. PATENT DOCUMENTS 6,039,367 A * 3/2000 Muller et al. .................. 293/117
6,318,774 B1 * 11/2001 Karr et al. ..................... 293/117
(Continued)

FOREIGN PATENT DOCUMENTS

DE          100 39 060 A1    3/2002
DE     10 2010 045 971 A1    3/2012
(Continued)

OTHER PUBLICATIONS

Translation of WO2009144545.*

*Primary Examiner* — Daniel Pihulic
(74) *Attorney, Agent, or Firm* — Muncy, Geissler, Olds & Lowe, P.C.

(57) ABSTRACT

An arrangement on a component of a motor vehicle, having a sensor with a substantially planar end surface, a sealing ring which encloses the sensor, and a carrier element for maintaining the spacing of the sensor in the axial direction relative to the component. The sensor extends with the sealing ring into a cut-out of the component. The sensor has a surrounding sealing ring, an additional ring element which lies further to the outside in a radial direction and has at least two cut-outs which are distributed over the circumference. The elastic ring element of the sealing ring or decoupling ring seals against water which enters from outside and for correct self-positioning in the cut-out of the component. The cut-outs according in the ring element, which lies on the outside, allow water which has entered to drain.

6 Claims, 4 Drawing Sheets

(51) Int. Cl.
*G01S 15/93* (2006.01)
*G01S 7/521* (2006.01)

(56) References Cited

U.S. PATENT DOCUMENTS

| | | | |
|---|---|---|---|
| 7,384,082 B2 * | 6/2008 | Blake | 293/117 |
| 2012/0000302 A1 | 1/2012 | Inoue et al. | |
| 2012/0056043 A1 | 3/2012 | Inoue et al. | |
| 2014/0347962 A1 * | 11/2014 | Baumann et al. | 367/188 |

FOREIGN PATENT DOCUMENTS

| | | | | |
|---|---|---|---|---|
| DE | 11 2010 001 962 T5 | 8/2012 | | |
| EP | 1 710 785 A2 | 10/2006 | | |
| EP | 2 407 802 A1 | 1/2012 | | |
| JP | 4818490 B2 | 11/2011 | | |
| WO | WO 2009144545 A1 * | 12/2009 | | E01B 27/06 |
| WO | WO 2012034864 A1 * | 3/2012 | | G01S 7/521 |
| WO | WO 2013117442 A1 * | 8/2013 | | G01S 7/521 |

* cited by examiner

ARRANGEMENT ON A COMPONENT OF A MOTOR VEHICLE

This nonprovisional application is a continuation of International Application No. PCT/EP2013/051414, which was filed on Jan. 25, 2013, and which claims priority to German Patent Application No. 10 2012 002 760.5, which was filed in Germany on Feb. 11, 2012, and which are both herein incorporated by reference.

BACKGROUND OF THE INVENTION

1. Field of the Invention

The invention relates to an arrangement on a component of a motor vehicle, having a sensor with a substantially planar end surface, a sealing ring enclosing the sensor, and a support element for maintaining the spacing of the sensor in the axial direction relative to the component, whereby the sensor with the sealing ring extends into a cutout of the component in such a way that the end surface of the sensor substantially forms a plane with an outer surface of the component.

2. Description of the Background Art

It is known to arrange sensors in an outer shell of a vehicle. The surroundings are detected with such sensors and objects or obstacles are identified. For example, such sensors can be ultrasonic sensors, which are used for parking assist systems.

Such sensors are acoustically decoupled by a decoupling part from the component or the structure in which they are mounted, so that arising vibrations are not transmitted from the sensor to the component and from the component to the sensor. In addition a seal should be provided between the sensor and the component to prevent the entry of a liquid, normally water, into the cutout of the component. In most cases, these sensors have a circular cross section and the decoupling or sealing parts a ring-shaped cross section. Known solutions use a so-called decoupling ring to achieve both goals.

Ultrasonic sensors send out ultrasonic signals, which are reflected from an object or obstacle located within the transmission area and are received by the same or other ultrasonic transducers. It is important for this reason that the diaphragm on the end surface of the sensor can oscillate freely. Therefore, a ring-shaped decoupling part is used to isolate the diaphragm acoustically from the installation surroundings—the component. In the case of an undesirable acoustic coupling between the sensor and component, the sensor no longer fulfills its function correctly and the coupled-in sound can again excite the diaphragm or be radiated backwards into the component. Such a situation can occur when water that has penetrated has frozen and forms an acoustic bridge. This can have the result that received vibrations are detected erroneously.

DE 100 39 060 A1 discloses an arrangement with a decoupling ring and a sealing ring with a conical axial cross section. It is a disadvantage in this regard that tolerances can arise between the diameter of the cutout in the component and the sealing ring. A consequence of these differences in cross section between the cutout in the component and the sealing ring is that water can penetrate between the sealing ring and the cutout. This can occur particularly in car wash facilities.

Decoupling rings are known, moreover, which have a circumferential bead. In the case of these decoupling rings, it can happen, as described above, that water entering under pressure cannot drain off rapidly enough and can freeze at low temperatures and thereby can reduce the action of the decoupling ring, because the solid ice can produce an acoustic connection between the sensor and component, as a result of which undesirable vibrations are transmitted between the sensor and the component.

If the sealing ring with a circumferential bead is acted on by pressurized water, the striking water can penetrate between the component and sealing ring. The remaining water can rapidly freeze and result in a decoupling of the emitted sound in the installation surroundings, for example, the bumper of the vehicle. The sensor is disrupted by this and the detection of phantom obstacles can result.

SUMMARY OF THE INVENTION

It is therefore an object of the invention to provide an arrangement that assures a stable acoustic decoupling of the component and sensor and enables a draining off of the water that has penetrated.

An arrangement of the invention comprises a component, for example, a bumper of a motor vehicle, and a sensor, which is arranged in a cutout of the component, whereby the end surface of the sensor substantially forms a plane with the component. The sensor arranged on the component is in particular an ultrasonic sensor and part of a driver assistance system of a motor vehicle.

In the arrangement according to an embodiment of the invention, the sensor can include a sealing ring, which also extends into the cutout of the component. The sealing ring serves in particular to seal the sensor from the component. An additional object of the sealing ring is the mechanical or acoustic decoupling of the sensor from the component.

According to an embodiment of the invention, the sealing ring enclosing the sensor has an additional ring element which lies farther to the outside in the radial direction and has at least two cutouts distributed over the circumference. A plurality of cutouts is conceivable. In other words, the outer ring element has a plurality of sections arranged in the shape of a ring. The end surface of the outer ring element lies against the inner side or surface of the component. According to an embodiment of the invention, the seal and the outer ring element are formed as a single piece.

The sealing ring with the outer ring element can form a hollow-cylindrical subregion, whereby bars and/or plates and/or nubs are arranged in the rotation direction on the outer ring element. If bars are used, in an embodiment of the invention these can be formed in such a way that they connect the sealing ring and the outer ring element. In an embodiment of the arrangement of the invention, the arrangement of bars and cutouts is selected in such a way that a draining off of water that has penetrated is assured at all times. Further, the plates can be formed in the shape of rectangular ribs, whose long side runs in the radial direction of the hollow cylinder. A circumferential, interior circle of bumps or columns circular in cross section can also be formed.

The bars and/or plates and/or nubs of the invention can be used to keep the outer ring element in a fixed position and thereby to assure the seal between the sensor and component.

In an embodiment of the invention, the sealing ring can be formed simultaneously as a decoupling ring.

The sealing ring and/or the ring element can include a polymer, for example, silicone.

The ring element of the invention from the sealing or decoupling ring is used for sealing against water entering from the outside and for a correct self-positioning of the sensor in the cutout of the component. The cutouts of the invention in the outer ring element permit the water that has penetrated to drain off.

The ring element can be made elastic in order to compensate for tolerances in the axial direction between the sensor, the component, and the support element. The tolerances can be caused, for example, by irregularities in the connections between the support element and the component or by tolerances in the support element itself.

A further advantage of the embodiment of the sealing ring as taught by the invention is that the consumption of materials and the weight can be kept low.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
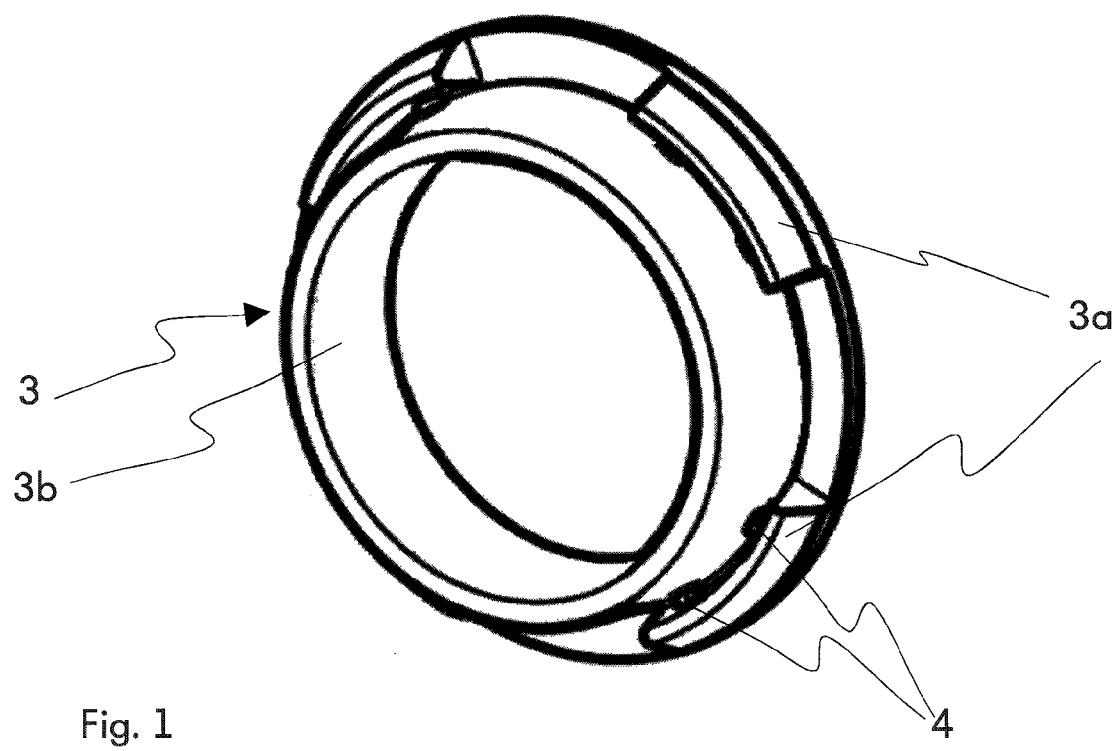
FIG. 1 is a perspective view of an embodiment of the sealing ring.
Figure 2:
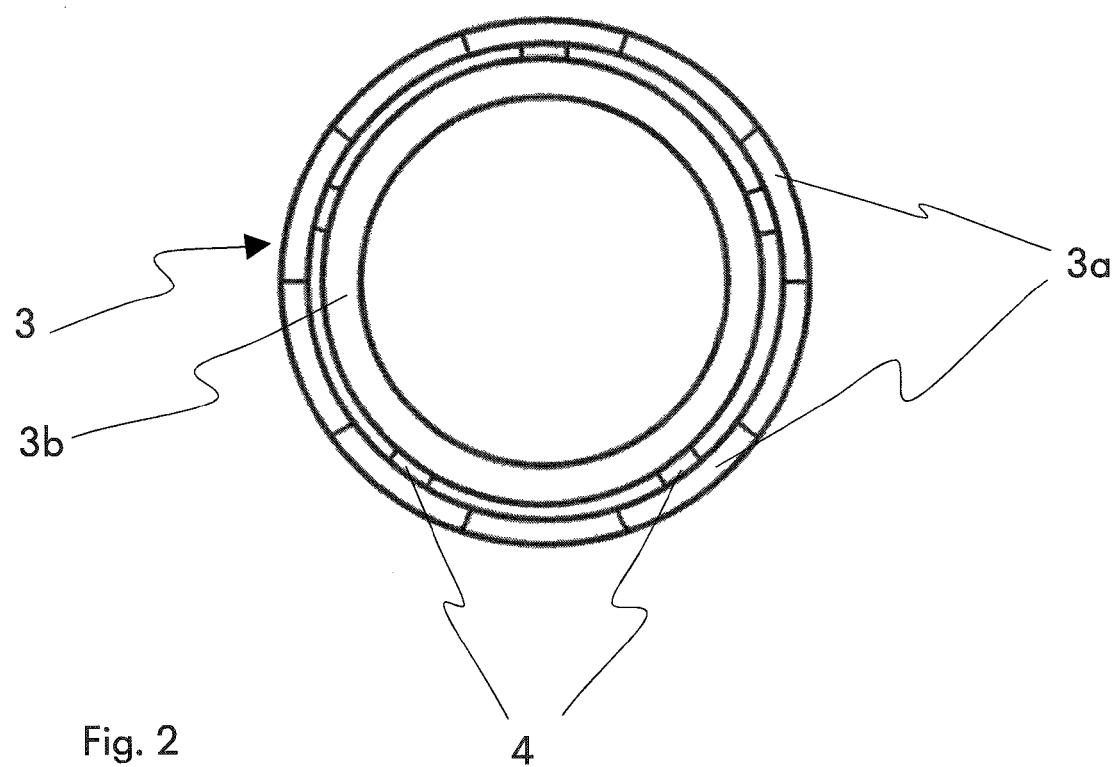
FIG. 2 is a view in the axial direction of an embodiment of the sealing ring of the invention.

Sealing ring 3, which serves additionally also as a decoupling ring, is shown in FIG. 1 and FIG. 2. It has a hollow-cylindrical body 3b with an outer and spaced-apart ring element 3a. The outer ring element 3a has a number of cutouts distributed on its circumference. The outer ring element on its inner side in addition has stabilizing plates, nubs, and/or bars, which optionally can also be connected to hollow-cylindrical body 3b of the sealing ring. In the exemplary embodiment of FIG. 1, the outer ring element 3a has four sections distributed on the circumference, each of which has two bars 4 for stabilization. The exemplary embodiment in FIG. 2 shows a ring element 3b with five arranged sections each with one bar per section.

Figure 3:
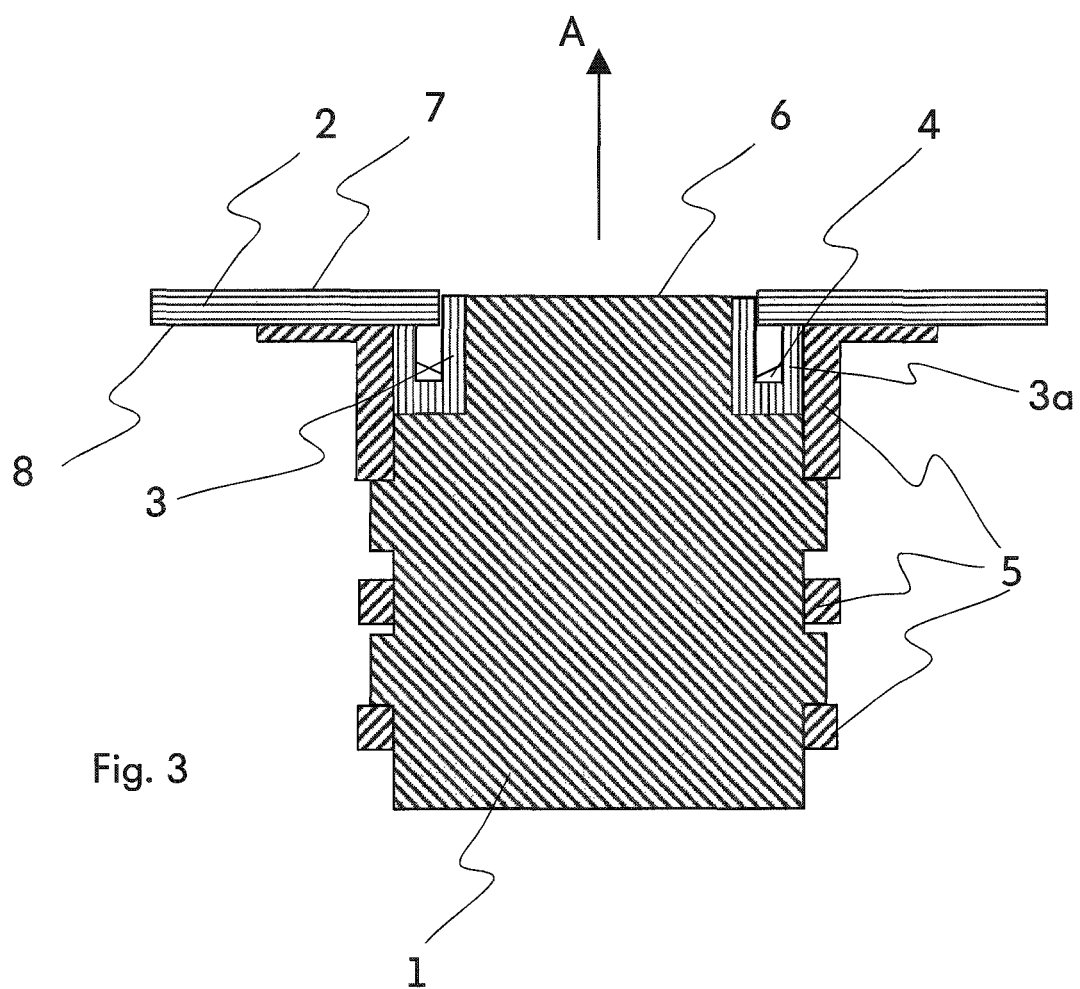
FIG. 3 is a schematic sectional diagram through an arrangement of the invention, in a cutout of the component with a support element, a sensor, and the sealing ring of the invention, whereby the outer ring element with the bars arranged on the ring element can be seen.
Figure 4:
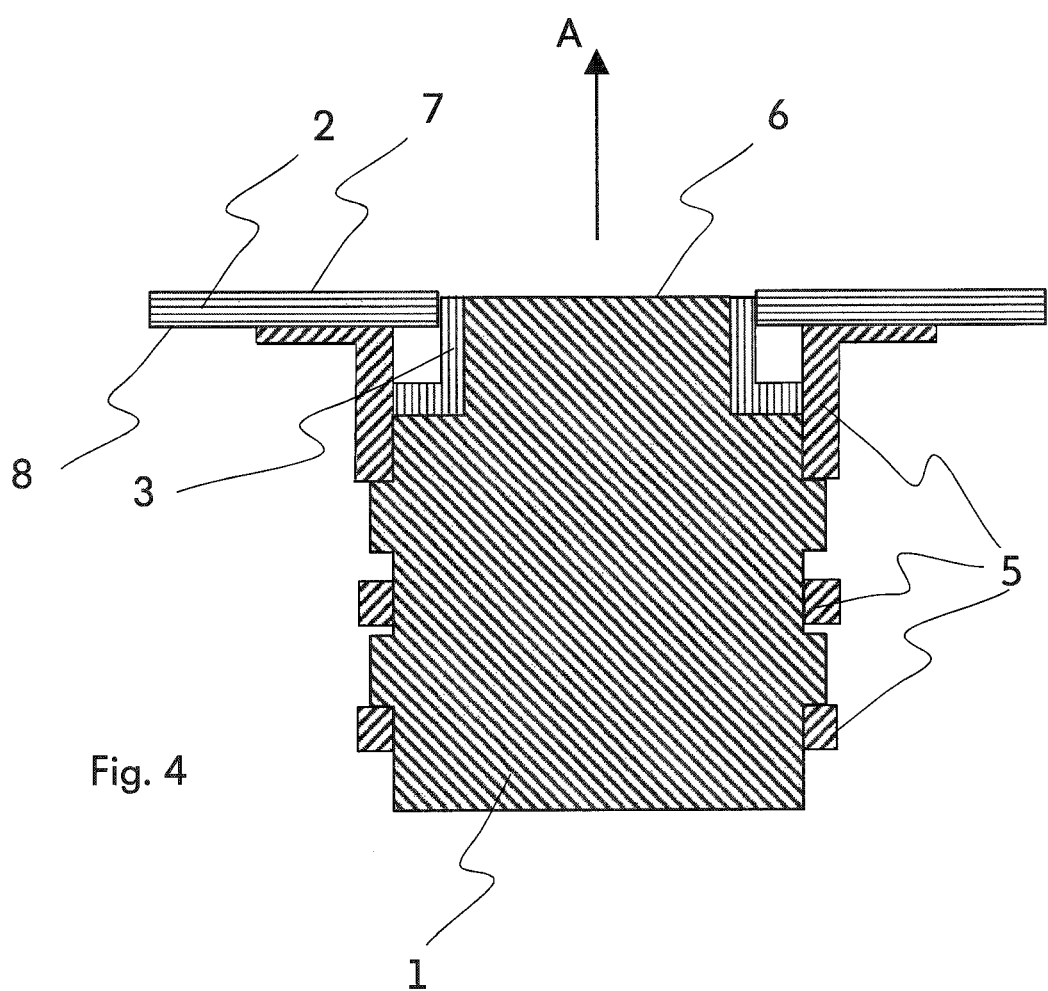
FIG. 4 is a further schematic sectional diagram through the arrangement of the invention, whereby the section runs through the cutouts of the outer ring element.

Component 2 of FIGS. 3 and 4 runs parallel to a plane which is perpendicular to the axial direction A. The axial direction A coincides with the axis of rotation of a sensor 1 formed substantially rotationally symmetric. Sensor 1 comprises particularly a diaphragm cup which joins end surface 6. Sensor 1 extends in areas into the cutout of component 2 so that its end surface 6 substantially forms a plane with the outer side 7 of component 2.

Sensor 1 is to be sealed from penetrating water and to be decoupled from component 2 with respect to possible vibration transmission. For this purpose, it is enclosed by sealing ring 3 formed also rotationally symmetric around direction A. As already described with respect to FIG. 1, sealing ring 3 has a spaced-apart outer ring element 3a with cutouts. The end side of outer ring element 3a of sealing ring 3 comes to lie against inner side 8 of component 2.

Sealing ring 3 is made of silicone as a single piece with an outer ring element 3a and is at least partially elastic.

In cross section the outer ring element 3a can be substantially rectangular or triangular.

The axial position of sensor 1 is determined by support element 5.

The outer ring element 3a can be formed plates (not shown). The plates are arranged circumferentially around hollow-cylindrical ring 3b of sealing ring 3. All plates together form the (assembled) outer ring element 3a.

In the exemplary embodiment, outer ring element 3a is represented by a section which is arranged on an outer circumference and is connected to the sealing ring by bars or ribs. In the event that water penetrates between hollow-cylindrical part 3b and outer ring element 3a, it can flow out rapidly through the cutouts in outer ring element 3a, as shown in FIG. 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement on a component of a motor vehicle, the arrangement comprising:
   a sensor with a substantially planar end surface;
   a sealing ring encircling the sensor; and
   a support element for maintaining the spacing of the sensor in an axial direction relative to the component,
   wherein the sensor with the sealing ring extends into a cutout of the component such that the end surface of the sensor and an outer side of the component substantially lie in a same plane,
   wherein the sealing ring has a ring element that lies to an outside in a radial direction and has at least two cutouts distributed over a circumference, and
   wherein an end side of the ring element lies against an inner side of the component.

2. The arrangement according to claim 1, wherein the sensor is an ultrasonic sensor.

3. The arrangement according to claim 1, wherein the sealing ring is a decoupling ring to prevent transmission of vibrations.

4. The arrangement according to claim 1, wherein the ring element is connected via bars at an inner side to the sealing ring.

5. The arrangement according to claim 1, wherein the sealing ring and/or the ring element is made of a flexible material, a polymer, or a silicone.

6. The arrangement according to claim 1, wherein the component is an exterior component of the vehicle, particularly a bumper of the vehicle.

* * * * *